(12) United States Patent
Witte (10) Patent No.: US 7,364,146 B2
(45) Date of Patent: Apr. 29, 2008

(54) STRUT OR RECEIVING PART HAVING A RECTANGULAR CROSS-SECTION FOR A SYSTEM FOR CONSTRUCTING DEVICES FOR CLAMPING WORKPIECES

(75) Inventor: Horst Witte, Nahrendorf (DE)

(73) Assignee: Horst Wille Entwicklungs-und Vertriebs KG, Nahrendorf (DE)

( * ) Notice: Subject to any disclaimer, the term of this patent is extended or adjusted under 35 U.S.C. 154(b) by 134 days.

(21) Appl. No.: 11/234,058

(22) Filed: Sep. 22, 2005

(65) Prior Publication Data

US 2006/0063398 A1 Mar. 23, 2006

(30) Foreign Application Priority Data

Sep. 23, 2004 (DE) .................. 20 2004 014 974 U (51) Int. Cl.
*B25B 1/20* (2006.01)
(52) U.S. Cl. ..................... 269/45; 269/88; 269/900
(58) Field of Classification Search ............. 269/45, 269/43, 289 R, 291, 88, 900
See application file for complete search history.

(56) References Cited

U.S. PATENT DOCUMENTS 4,125,251 A    11/1978  Jamieson, Jr.
4,440,704 A *  4/1984  Bussey, Jr. .................. 264/51
6,494,445 B1 * 12/2002  Bellis, Jr. ..................... 269/71
2006/0237378 A1* 10/2006  Pellegriono et al. .......... 211/29

FOREIGN PATENT DOCUMENTS

| DE | 25 04 721 | 8/1976 |
|---|---|---|
| DE | 89 10 310 | 10/1991 |
| DE | 92 18 405 | 4/1994 |
| DE | 100 22 228 | 11/2001 |
| DE | 203 15 497 | 2/2004 |
| DE | 203 15 498 | 2/2004 |
| EP | 02 22 147 | 5/1987 |
| EP | 1 484 454 | 12/2004 |
| GB | 967 965 | 8/1964 |

* cited by examiner

*Primary Examiner*—Lee D Wilson
(74) *Attorney, Agent, or Firm*—Friedrich Kueffner (57) ABSTRACT

A strut for a system for constructing devices for clamping workpieces in defined and reproducible positions is made of an angle section or a U-shaped section or a rectangular section. The strut has grid bores of identical diameter arranged at a regular grid spacing relative to one another. The grid bores are provided on legs of the strut and are accessible from both sides of the legs, respectively. Several struts are combined to a receiving part in that the struts are arranged parallel to one another and connecting elements are used to connect the struts to one another. The connecting elements are inserted into the grid bores.

3 Claims, 7 Drawing Sheets

STRUT OR RECEIVING PART HAVING A RECTANGULAR CROSS-SECTION FOR A SYSTEM FOR CONSTRUCTING DEVICES FOR CLAMPING WORKPIECES

BACKGROUND OF THE INVENTION

1. Field of the Invention

The invention relates to a strut or a receiving part for a system for constructing devices for clamping workpieces in defined and reproducible positions wherein the strut has grid bores of identical diameter at regular grid spacings. The receiving part for such a system for constructing devices for clamping workpieces is comprised of struts of the aforementioned kind.

2. Description of the Related Art

Such a system is disclosed in European patent document 222 147. In this system, marketed under the trademark "Alufix", has struts or receiving parts of a rectangular or square cross-section. They either have a solid cross-section or are comprised of a closed hollow section having at its sides the grid bores that serve for receiving special connecting elements that are provided for attaching workpiece receptacles and auxiliary parts and can also be used for connecting the individual struts or receiving parts to one another. Since the grid bores are not accessible from the interior but only from the exterior, the connecting elements are accordingly of a relatively complex design and mounting is difficult and time-consuming. The struts of rectangular or square cross-section are made from an aluminum alloy in a special extrusion molding process so that their manufacture is rather expensive. This known system provides very high precision and reproducibility. However, applications are conceivable that do not demand fulfillment of such high requirements with regard to dimensional precision, especially when a less expensive configuration is achieved in this way.

SUMMARY OF THE INVENTION

It is an object of the present invention to provide a strut or a receiving part of the aforementioned kind that can be produced inexpensively and enables in particular a simpler assembly and a simpler construction.

In accordance with the present invention, this is achieved by a strut having grid bores of identical diameter arranged at regular coordinate or grid spacings and comprised of angle sections and/or U-shaped sections or similar rectangular sections having a leg that is provided with grid bores that are accessible from both sides.

Such a strut can be combined to receiving parts of different configurations wherein the receiving parts are comprised of at least two struts of angle sections and/or U-shaped sections arranged parallel to one another and connected to one another by connecting elements that are insertable into the grid bores.

The invention provides a strut for constructing a system as disclosed in European patent document 222 147. These struts can be manufactured of conventional angle sections and/or U-shaped sections, including also T-shaped sections, I-shaped sections, and Z-shaped sections, made of suitable aluminum alloys. The grid bores are provided in the legs of the sections in the same way as in the known system. They are arranged at a grid spacing that matches basically that of the known system. However, the grid bores are accessible from both sides, i.e., also from the back, because the aforementioned sections are "open" sections. In this way, it is possible to employ simple connecting elements that, as a result of the easy accessibility, can be easily and safely attached. The entire cross-section of the grid bores is available for receiving and arranging the appropriate part of the connecting elements.

Bevels provided at the surfaces enable compensation of tolerances that can be present when using commercially available angle sections and U-shaped sections.

The connecting elements for connecting the struts and/or receiving parts are comprised of a base plate having at least two fastening pins spaced at the grid spacing relative to one another, wherein the fastening pins can be inserted with precise fit into the grid bores (see FIGS. 3 and 17-20). Preferably, the connecting element has fastening pins that are arranged on two lateral surfaces adjoining one another at a right angle, wherein the fastening pins are spaced at the grid spacing relative to one another and are beveled so as to be inserted at approximately 45° into the corner of an angle section, wherein additional fastening pins and/or fastening bores are provided at the grid spacing (see FIGS. 5 to 10).

Preferably, the connecting element is designed such that the base plate has four fastening pins arranged in a square at the grid spacing, wherein the fastening pins each have a fitting section adjoining the base plate for precise insertion into a grid bore and a coupling section, wherein the four coupling sections are connectable positive lockingly (with positive fit) to a pressure plate having four matching coupling openings and are securable by a central pressure screw.

Figure 11:
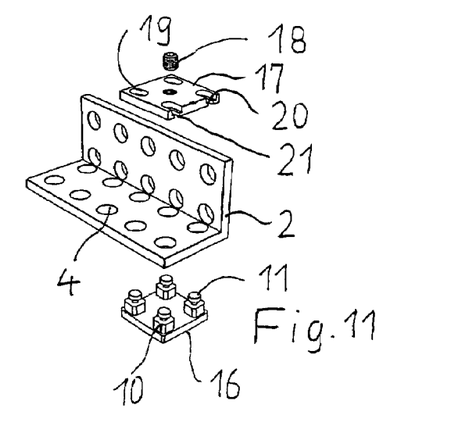
FIG. 11 is a perspective exploded view of an angle section with a connecting element of a first embodiment comprising four fastening pins and a pressure plate.
Figure 12:
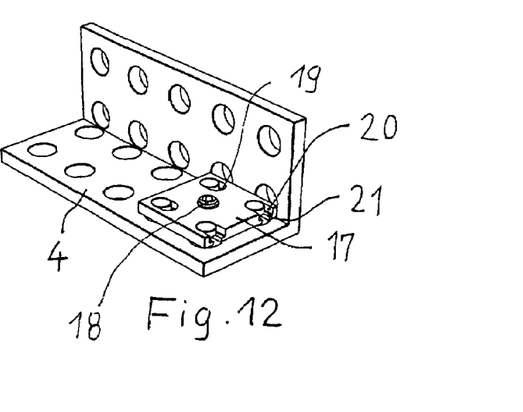
FIG. 12 shows the connecting element according to FIG. 11 attached to the angle section.

The coupling sections can be in the form of screws having screw heads that can be connected with positive fit to the coupling openings in the pressure plate (see FIGS. 11 and 12). Alternatively, the coupling sections can be monolithic coupling projections which can be connected in a positive locking way to the coupling openings in the pressure plate (see FIGS. 13 to 16).

These embodiments of connecting elements are provided for connecting struts and receiving parts with one another and also for attaching tool receptacles or other components. For this reason, the connecting elements can be designed very differently.

Figure 2:
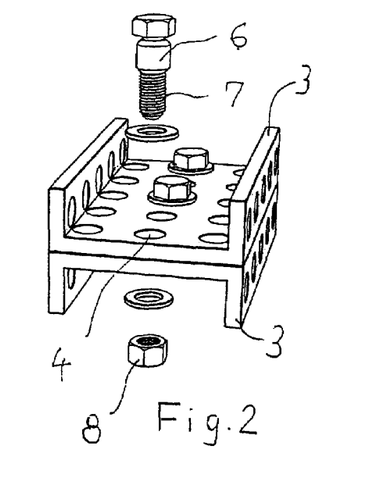
FIG. 2 is a perspective view of a receiving part, comprised of two U-shaped sections, connected by fitting screws.
Figure 3:
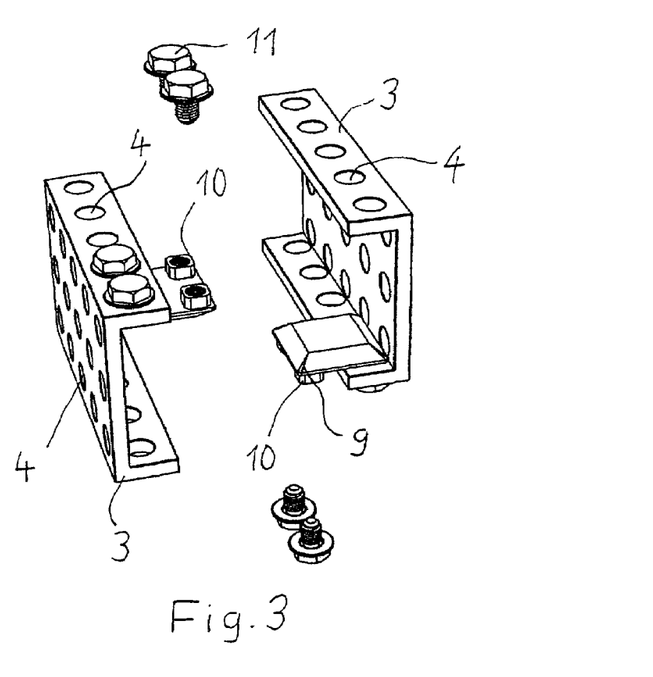
FIG. 3 is an exploded perspective view of a receiving part that is comprised of two U-shaped sections and connected by means of special connecting elements.
Figure 8:
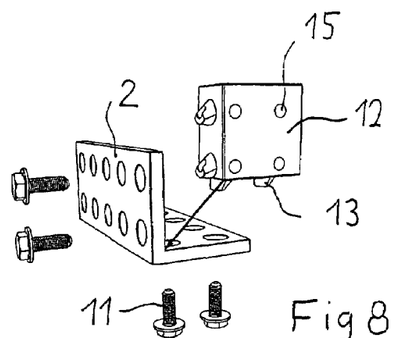
FIG. 8 shows in the connecting element in the rotated position relative to FIG. 5.
Figure 9:
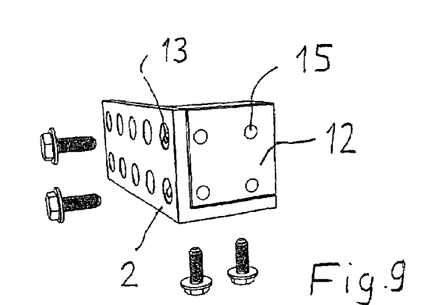
FIG. 9 illustrates the connecting element after having been inserted into the grid bores of the angle section.
Figure 10:
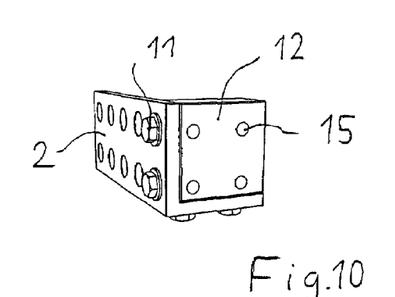
FIG. 10 shows the connecting element in the mounted and secured position.

It is important in this connection that the fastening pins are provided on a base plate and are positioned at the grid spacing relative to one another and can be inserted with precise fit into the grid bores that are also provided as fitting bores. The fastening pins are matched with regard to their length to the single or multiple thickness of the sections. When they are used as illustrated in FIG. 3, they have a "single length". When they are used for connecting two sections, as shown in FIG. 2, they have a double length. This double length is illustrated in FIG. 8. In this way, a precisely fitting connection of the sections with one another and a precise attachment of further tools and workpiece receptacles are provided.

In an advantageous embodiment, the connecting elements have a base plate with at least two fastening pins positioned at the grid spacing relative to one another. Preferably, four pins are arranged at the grid spacing and form a square. These connecting elements are arranged for connecting two sections such that one or two pins, respectively, engage the grid bores of one section and the other pin or pins engaged the grid bores of the other section. When the connecting elements are provided only for the purpose of attaching additional workpiece receptacles, the arrangement on only one section is possible also.

An especially advantageous configuration is provided in that the pressure plate provides a quick connect device because, depending on its configuration, it can be placed or pushed onto at least four fastening pins and can be secured by a single pressure screw. The connection to the fastening pins is of the positive locking kind.

The fastening pins themselves are designed such that they fit precisely into the grid bores. For this purpose, they can have a substantially square cross-section and are rounded only at the corners or provided with a radius such that a precise fit results. When two sections are to be connected to one another, either screws are inserted into the fastening pins, which screws are fitting screws, or the pressure plate is used.

Figure 4:
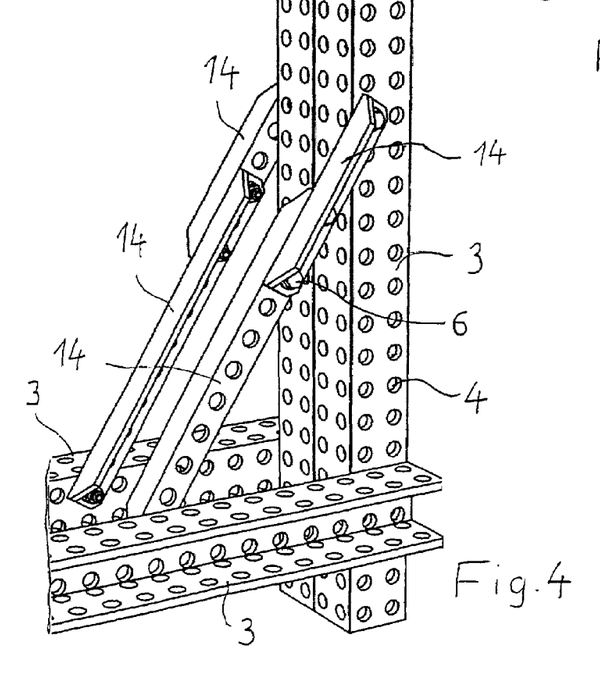
FIG. 4 is a perspective view of a corner connection in which diagonal struts compensate the displacement between receiving parts arranged at an angle to one another.
Figure 5:
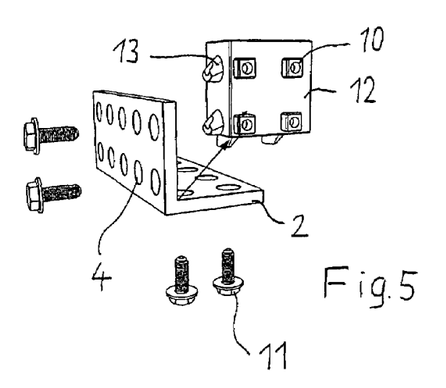
FIG. 5 is an exploded perspective view of a corner connection for an angle section with a special connecting element.
Figure 6:
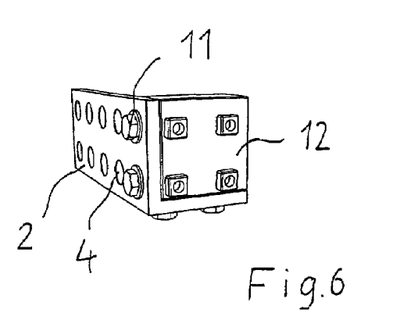
FIG. 6 shows the connecting element of FIG. 5 in the mounted position.

A diagonal strut for corner connections of the struts or receiving parts according to the invention is comprised of two angle sections wherein at least one of the legs is provided with grid bores, respectively. The angle sections are connected to one another back-to-back for compensation of the displacement of two struts or receiving parts connected to one another (FIG. 4). The angle sections can be connected to one another by fitting screws inserted into the grid bores. Such diagonal struts can be used advantageously in a system for constructing devices of the aforementioned kind that is built of struts and receiving parts in accordance with the present invention in order to compensate displacement between two angle sections and/or U-shaped sections that are connected to one another by connecting elements.

DESCRIPTION OF THE PREFERRED EMBODIMENTS

Figure 1:
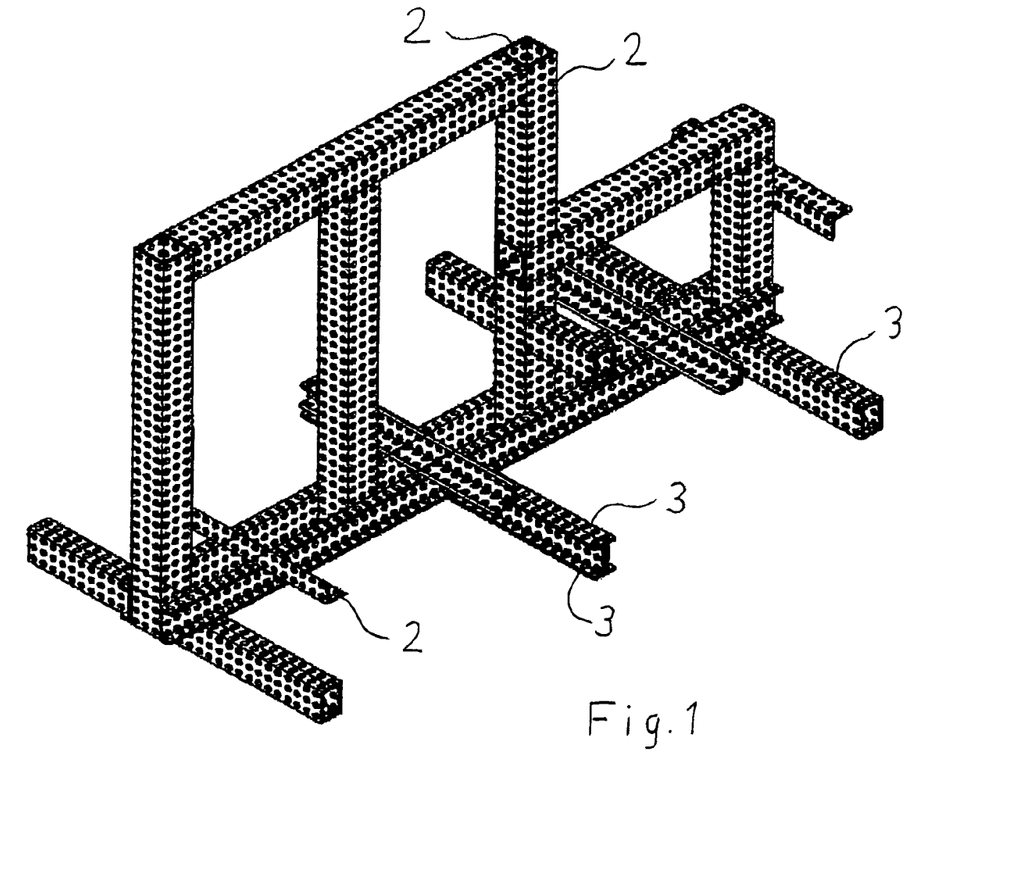
FIG. 1 is a perspective view of a system for constructing devices for clamping workpieces, wherein the system is comprised of struts and receiving parts by using appropriate connecting elements.

FIG. 1 shows a system according to the invention for constructing devices for clamping workpieces in defined and reproducible positions. The system is comprised of different receiving parts that have either a closed cross-section or an open cross-section and are combined of angle sections and/or U-shaped sections. At a regular grid spacing, these sections have grid bores that preferably are formed as fitting bores and serve for fastening connecting elements for mounting additional tools and for connecting the sections to one another.

The individual struts that form the receiving parts of the system can be designed and combined in the way illustrated in FIGS. 2 and 3. In principle, open sections that are angle sections 2 or U-shaped sections 3 are suitable; they are assembled by fitting screws 6, 7 and nuts 8 (FIG. 2) or special connecting elements (FIG. 3). When the assembly is realized in the way illustrated in FIG. 2, an open double-T-shaped section (I-shaped section) is formed of two U-shaped sections. In the configuration according to FIG. 3, a closed rectangular section is shown that comprised of two U-shaped sections.

Figure 19:
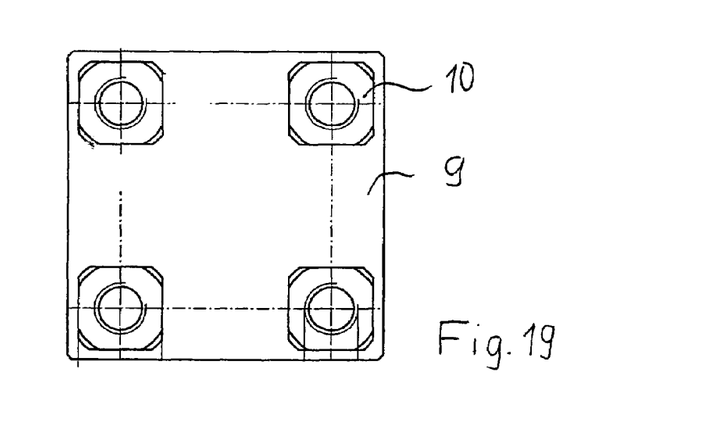
FIG. 19 is an end view of a connecting element with four fastening pins.
Figure 20:
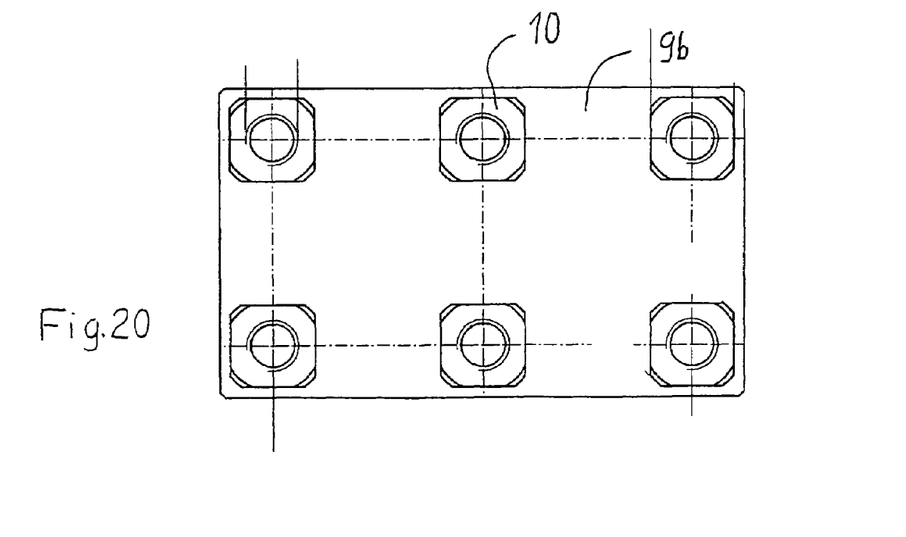
FIG. 20 is an end view of connecting element with six fastening pins.
Figure 21:
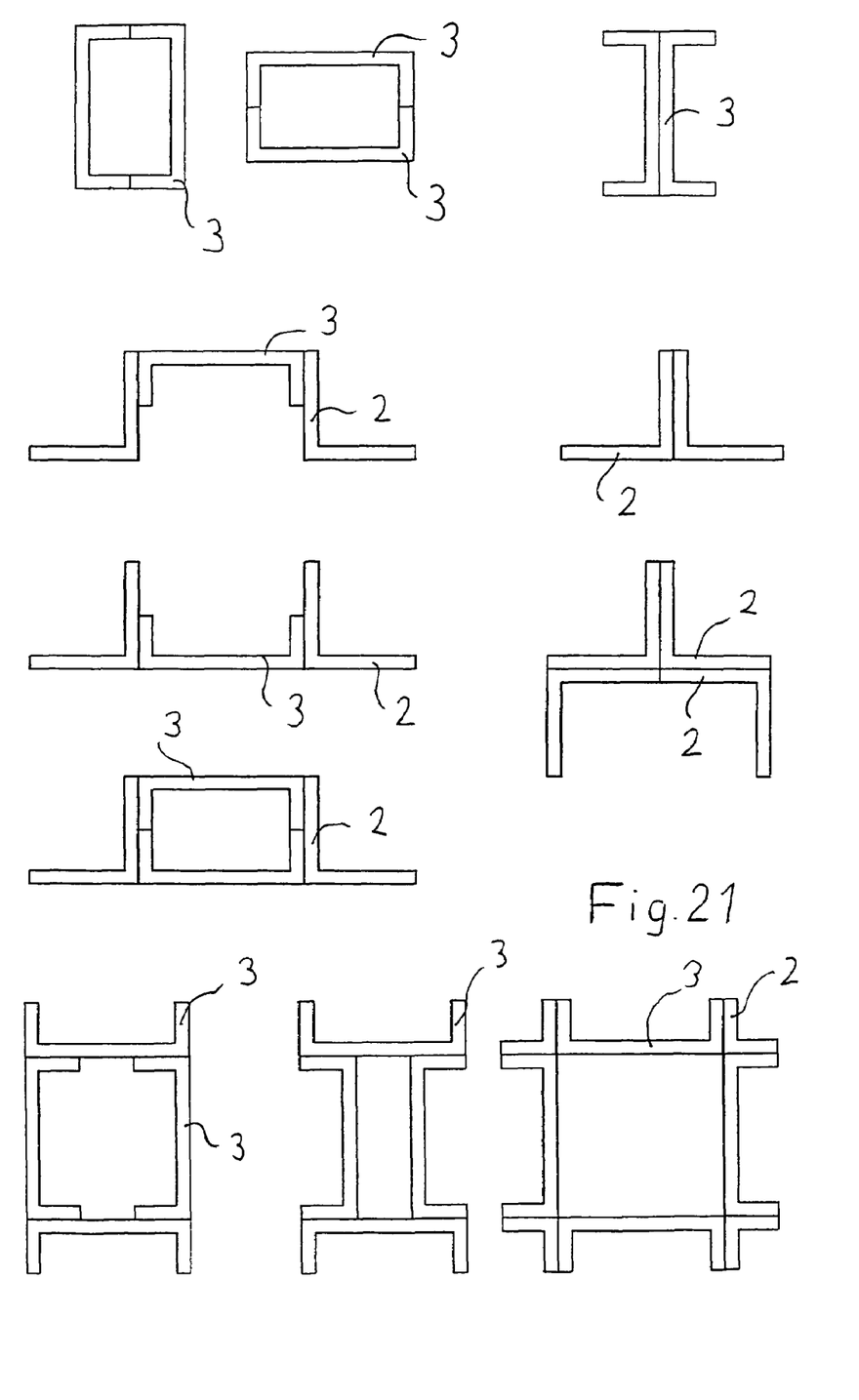
FIGS. 21a through 21k show end views of different cross-sectional shapes composed of different angle section and/or U-shaped sections.
Figure 21A:
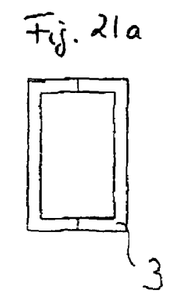
Figure 21B:
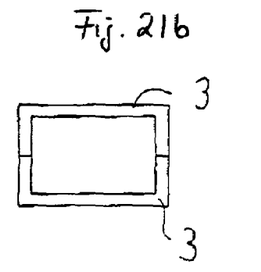
Figure 21C:
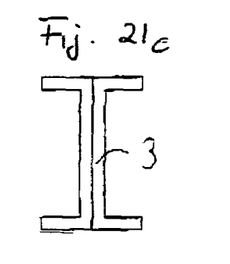
Figure 21D:
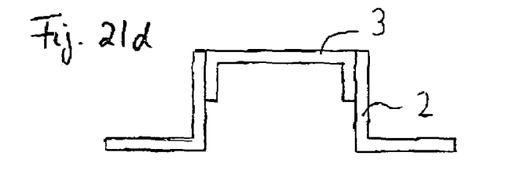
Figure 21E:
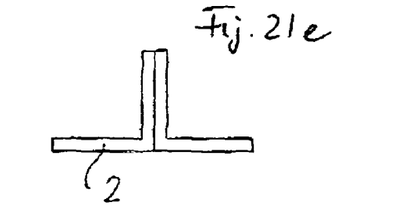
Figure 21F:
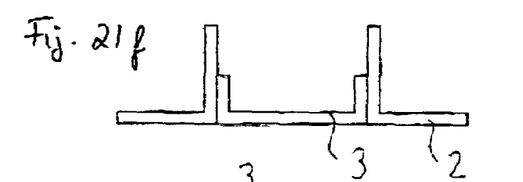
Figure 21G:
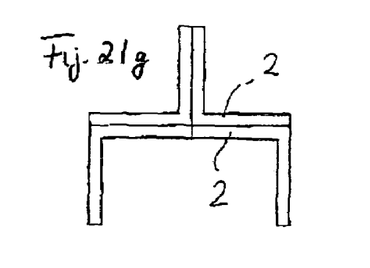
Figure 21H:
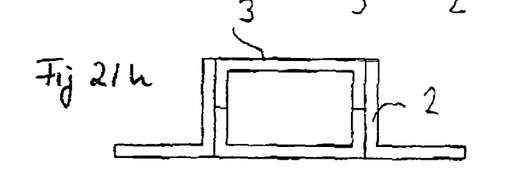
Figure 21I:
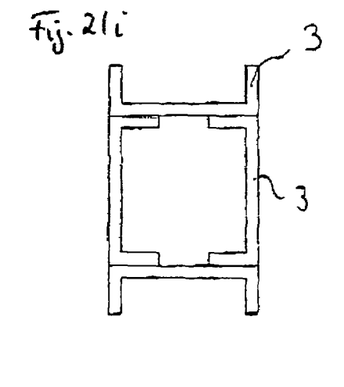
Figures 21J, 21K:
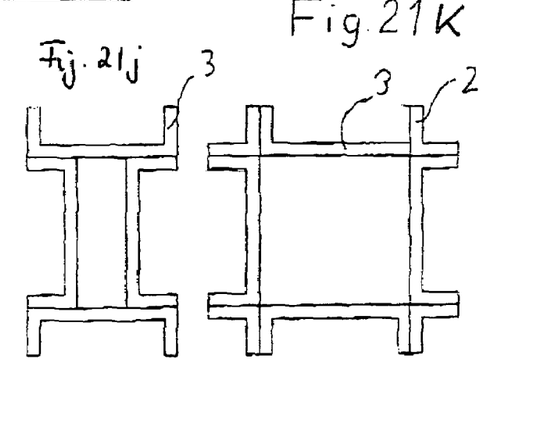

A connecting element of the type illustrated in FIG. 3 (variations are illustrated in FIGS. 17 through 20) has a base plate 9 with four fastening pins 10 (FIG. 3 and FIG. 19). When such a connecting element is used, the fastening pins 10 fit precisely into the grid bores of the struts because their four corners are machined appropriately and are rounded. The four corners are positioned on a diameter through the center of the threaded bore in the fastening pins that serve for receiving the screws 11. By means of such connecting elements, a rigid and very precise connection of two angle sections and/or U-shaped sections can be produced. In FIGS. 21a to 21k, examples of possible combinations are illustrated.

In FIG. 4, a corner connection is illustrated that is comprised of U-shaped sections 3 arranged by means of connecting elements (not illustrated) at a right angle to one another. This configuration is reinforced by diagonal struts which are comprised of two angle sections 14, connected back-to-back. Each angle section 14 has one leg that is provided with grid bores 4 at the predetermined grid spacing of the system. They serve for connecting the angle sections of a diagonal strut to one another as well as for attaching a diagonal strut to the angle sections 3. By taking into consideration the Pythagorean theorem, it is possible to select without difficulties grid bores that are spaced at the grid spacing in order to enable the illustrated configuration.

When the grid bores on the U-shaped section have a spacing of six grid bores and a spacing of eight grid bores on the other perpendicularly extending U-shaped section, a distance of 10 grid bores is to be selected on the diagonal strut.

A special connecting element 12 is illustrated in FIGS. 5 through 10. This connecting element is a so-called end plate that has special fastening pins 13 arranged on two lateral surfaces that are positioned at a right angle to one another; the fastening pins 13 are beveled such that they can be inserted into the corner of an angle section. At the end face illustrated in FIG. 5 and FIG. 6 fastening pins 10 are formed that match those of FIG. 3 and serve for arranging an additional section thereat at an angle or for attaching a tool receptacle.

Figure 7:
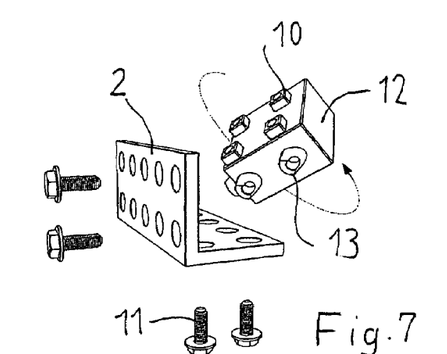
FIG. 7 illustrates in a perspective view the rotation of the connecting element of FIG. 5 to position the end face that is facing away in FIG. 5 so as to face the viewer.

This special connecting element 12 formed especially as an end plate can be rotated, as illustrated in FIG. 7, and fastening bores 15 are usually provided on the end face that is accessible from the front. The fastening bores 15 are, in turn, matched to the overall grid pattern and spacing of the grid bores. The rotated arrangement and subsequent attachment of the connecting element can be taken from the sequence illustrated in FIGS. 7 through 10.

FIGS. 11 through 16 show a connecting element that is designed as a quick fastening device. It is comprised of a base plate 16 with four fastening-pins 10 that precisely fit into the grid bores. Screws 11 are screwed in. A pressure plate 17 with special coupling openings 19 and 21 can be placed onto the screws so that a positive-locking connection is provided with the screws. A single centrally arranged pressure screw 18 serves for securing the pressure plate and thus for providing the desired precise arrangement of the connecting element.

Figure 13:
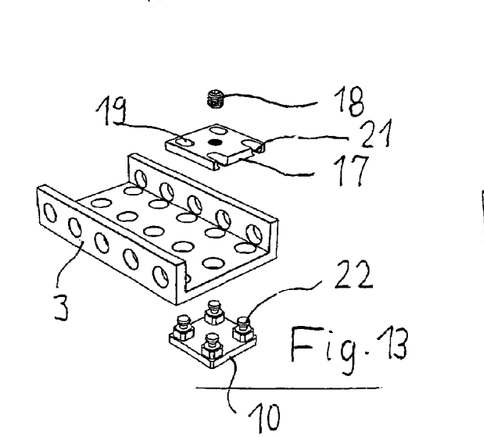
FIG. 13 shows a perspective exploded view of a U-shaped section with a connecting element of a second embodiment comprising a pressure plate.
Figure 14:
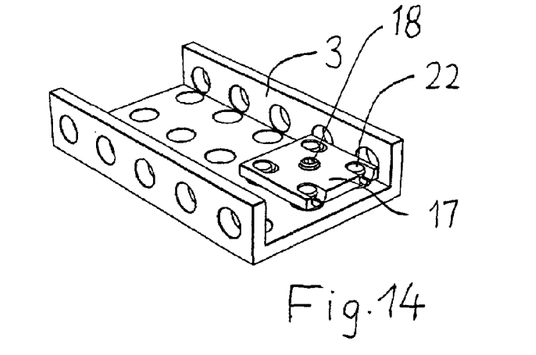
FIG. 14 shows the elements of FIG. 13 after completed assembly.

The embodiment according to FIGS. 13 and 14 differs from the embodiment of FIGS. 11 and 12 in that instead of the screws 11 monolithic projections 22 with round heads are used.

Figure 15:
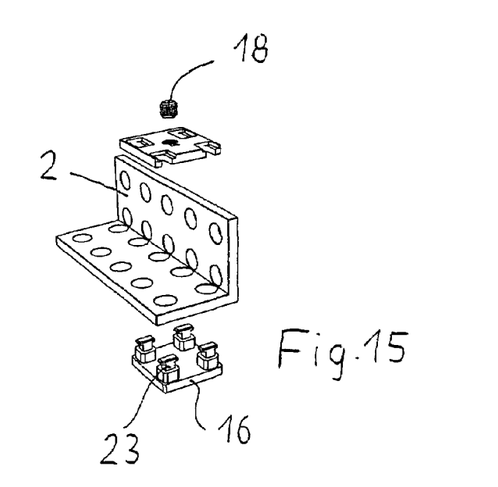
FIG. 15 is a perspective exploded view of a further embodiment of a connecting element in relation to an angle section.
Figure 16:
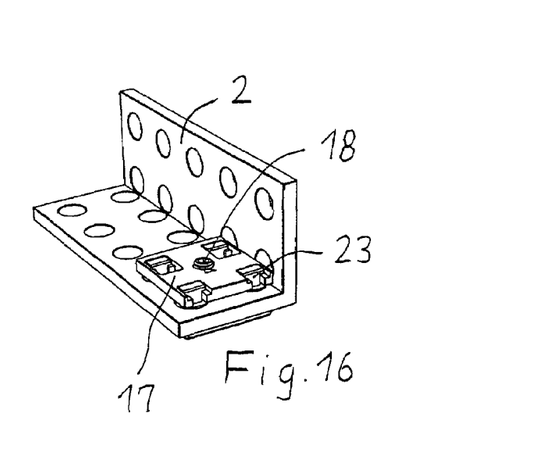
FIG. 16 shows the elements of FIG. 15 after completed assembly.
Figures 17, 18:
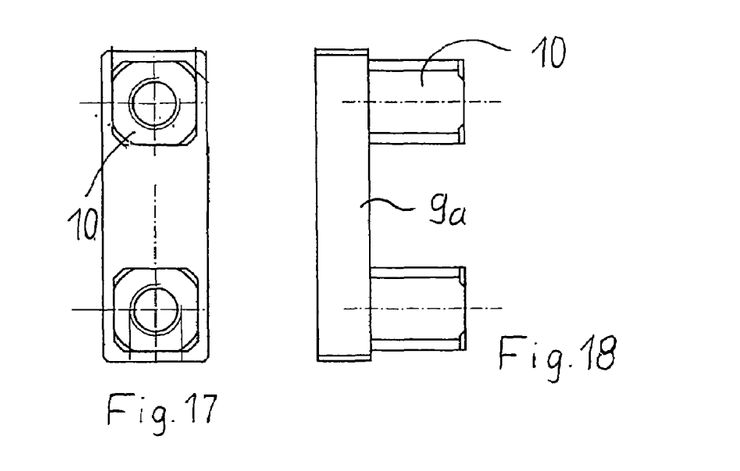
FIG. 17 shows a connecting element with two fastening pins in an end view.
FIG. 18 is a side view of the connecting element of FIG. 17.

The embodiment according to FIGS. 15 and 16 shows monolithic projections with rectangular cross-section 23 instead of the round monolithic-projections 22; the projections 23 engage accordingly the coupling openings 19 and 21 of the pressure plate and form a positive-locking connection after having been displaced.

FIGS. 17 to 20 show different connecting elements: a first one with a small base plate 9a that has two fastening pins 10; a base plate 9 with four fastening pins 10; and a base plate 9b with six fastening pins 10.

FIGS. 21a to 21k shows different cross-sectional shapes of receiving parts that are produced from different U-shaped sections and/or angle sections.

The angle sections or U-shaped sections (as mentioned above, they can be designed also as T-shaped sections, double-T-shaped sections or a Z-shaped section) are commercially available sections that are accordingly inexpensive. Upon assembly, minimal fluctuations in the thickness and in regard to other dimensions can be compensated by bevels that are provided in the grid bores as illustrated in FIGS. 7 and 8 as well as FIGS. 13 through 16. These bevels compensate dimensional fluctuations or tolerances so that the effective length of the grid bore is always the same.

The connecting elements of the different embodiments can be used for connecting the sections to one another as well as for attaching additional workpiece receptacles. In the latter case, so-called attachment elements are provided.

While specific embodiments of the invention have been shown and described in detail to illustrate the inventive principles, it will be understood that the invention may be embodied otherwise without departing from such principles.

What is claimed is:

1. A system for the construction of devices for clamping workpieces in a defined, reproducible position using struts, the struts having at regular coordinate spacings grid holes with identical diameters and having the shape of rectangular profiles, the rectangular profiles having legs provided with grid holes accessible from both sides, and connecting elements having fastening pins spaced with the spacings for insertion into the grid holes, the fastening pins being mounted on two rectangularly abutting external lateral faces of the connecting elements and being beveled such that they can be inserted at an angle of approximately 45° into the grid holes of the two legs.

2. The system according to claim 1, wherein the rectangular profiles are angular and/or U-profiles.

3. The system according to claim 1, further comprising additional fastening pins and fastening holes provided within the spacings on lateral faces of the connecting elements not provided with beveled fastening pins.

* * * * *